(12) United States Patent
Nanbu

(10) Patent No.: US 7,478,920 B2
(45) Date of Patent: Jan. 20, 2009

(54) BACKLIGHT AND LIQUID CRYSTAL DISPLAY DEVICE

(75) Inventor: Kohhei Nanbu, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 37 days.

(21) Appl. No.: 11/604,845

(22) Filed: Nov. 28, 2006

(65) Prior Publication Data

US 2007/0121318 A1    May 31, 2007

(30) Foreign Application Priority Data

Nov. 29, 2005    (JP) .............................. 2005-344076

(51) Int. Cl.
F21S 4/00    (2006.01)
(52) U.S. Cl. ...................... 362/225; 362/221; 362/222; 362/223; 362/276
(58) Field of Classification Search ................ 362/225, 362/221–224, 276; 349/61–62
See application file for complete search history.

(56) References Cited

U.S. PATENT DOCUMENTS 5,744,913 A * 4/1998 Martich et al. .............. 315/158
2005/0111225 A1   5/2005 Kim et al.

FOREIGN PATENT DOCUMENTS

| EP | 1 515 083 | A1 | 3/2005 |
| JP | 2001-210126 | A | 8/2001 |
| JP | 2003-330424 | A | 11/2003 |
| JP | 2003-331608 | A | 11/2003 |
| JP | 2004-318176 | A | 11/2004 |
| JP | 2004-327449 | A | 11/2004 |
| JP | 2004-348150 | A | 12/2004 |
| JP | 2005-005271 | A | 1/2005 |
| WO | WO-03/021565 | A1 | 3/2005 |

* cited by examiner

Primary Examiner—Jong-Suk (James) Lee
Assistant Examiner—Robert May
(74) Attorney, Agent, or Firm—Birch, Stewart, Kolasch & Birch, LLP

(57) ABSTRACT

A backlight in which a reflector is secured to a chassis disposing a mounted substrate mounting light emitting diodes between the reflector and the chassis by a lamp clip for holding lamps and the mounted substrate is connected to a drive substrate outside the chassis and also relates to a liquid crystal display device provided with the backlight and a liquid crystal panel. The backlight and the liquid crystal display device capable to detect colors accurately by blocking light transmitted other than through a transparent part of a lamp clip and prevent light from escaping through fitting holes for the lamp clip into a space outside a chassis are provided. A cover surrounding a photodiode and through holes to transmit light from the clip to an LED drive substrate is disposed between the chassis and the LED drive substrate. The cover includes a lower protrusion cover to enclose a lower protrusion of the clip and fitting protrusion covers disposed at opposing two sides adjacent the upper end of the lower protrusion cover to surround the fitting protrusions of the clip.

15 Claims, 8 Drawing Sheets

F I G. 6
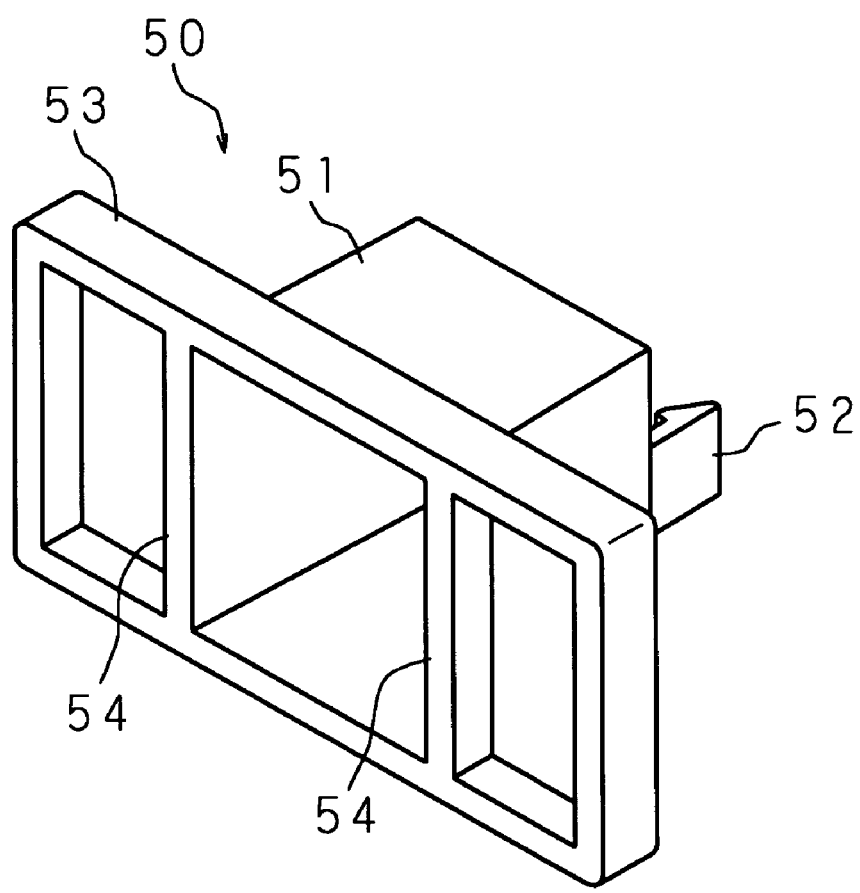

BACKLIGHT AND LIQUID CRYSTAL DISPLAY DEVICE

CROSS-REFERENCE OF RELATED APPLICATION

This nonprovisional Application claims priority under 35 U.S.C. §119(a) on Patent Application No. 2005-344076 in Japan on Nov. 29, 2005, the entire contents of which are hereby incorporated by reference.

BACKGROUND OF THE INVENTION

1. Field of the Invention

The present invention relates to a backlight in which a reflector is secured to a chassis disposing a mounted substrate mounting light emitting diodes between the reflector and the chassis by a lamp clip for holding lamps and the mounted substrate is connected to a drive substrate outside the chassis and also relates to a liquid crystal display device provided with the backlight and a liquid crystal panel.

2. Description of the Related Art

A backlight having lamps such as CCFLs (cold cathode type fluorescent lamps) and LEDs (light emitting diodes) is utilized in a liquid crystal display device. As disclosed in the Japanese Patent Application Laid-Open No. 2004-318176, the backlight supports lamps above a reflective sheet by means of a clip (lamp clip). FIG. 1 is a sectional view illustrating an exemplary arrangement and construction of the backlight in a simplified manner.

In the example as shown in FIG. 1, a reflective sheet 30a is secured to a chassis 36a disposing an LED substrate (mounted substrate) 35a mounting LEDs (light emitting diodes) 33 therebetween by means of a clip 10a and lamps 34 such as CCFLs and the like are supported above the reflective sheet 30a. The clip 10a is provided with an upper protrusion 20a projected upward from the reflective sheet 30a. An optical sheet 38 is disposed above the upper protrusion 20a and a liquid crystal panel 44 is positioned thereon. The clip 10a is white as in a surface of the reflective sheet 30a and reflects light.

The LEDs 33 mounted on the LED substrate 35a is configured to be driven by a drive circuit of an LED drive substrate (drive substrate) 44a outside the chassis 36a. Also a color sensor such as a photodiode (light receiving means) 42 is mounted on the LED substrate 35a. The photodiode 42 is connected to the LED drive substrate 44a. The photodiode 42 transmits color information to the LED drive substrate 44a and based on the color information the LED drive substrate 44a drives the LEDs 33 to adjust colors of light radiated onto the liquid crystal panel 40 into target colors.

However, as the photodiode 42 is mounted on the LED substrate 35a the LEDs 33 tend to have effects on the photodiode 42 nearby. The backlight in accordance with the prior art has a problem that colors of the light radiated on the liquid crystal panel 40 could not be detected accurately. Also, another problem is that the backlight in accordance with the prior art requires an aperture on the reflective sheet 30a for each photodiode 42 as well as a wiring arrangement to connect the photodiode 42 to the LED drive substrate 44a.

BRIEF SUMMARY OF THE INVENTION

One of the methods to solve the problems as described above is to form the clip 10a with a transparent material to transmit the light radiated above an upper surface of the reflective sheet 30a to a space outside the chassis 36a. FIG. 2 is a sectional view illustrating another exemplary arrangement and construction of a backlight in a simplified manner. A clip 10 is provided with a lower protrusion 18 and fitting protrusions 16 on a reflective sheet 30 side. An insert hole (through hole) 31 for insertion of the lower protrusion 18 of the clip 10 and fitting holes (fixing holes) 32 for insertion of the fitting protrusions 16 are formed on each of the reflective sheet 30, the LED substrate 35 and the chassis 36. Also, an LED drive substrate 44a is arranged outside the chassis 36 and a color sensor such as a photodiode 42 is disposed in the vicinity of a distal end of the lower protrusion 18 of the clip 10.

The whole of the clip 10 is transparent and light transmittable. Therefor, this construction enables the clip 10 to direct the light around an upper protrusion 20 above the reflective sheet 30 to the photodiode 42 located beneath the reflective sheet 30, and through solving the problem that light radiated by LEDs 33 tends to have effects on the photodiode 42 as explained above, accuracy in detecting the light around the upper protrusion 20 could be enhanced. As a result, accuracy in adjusting colors may be advanced. Also, placement of the photodiode 42 on the LED drive substrate 44a eliminates the need of a wiring arrangement to connect the photodiode 42 to the LED drive substrate 44a as explained above. Due to the same reason, the reflective sheet 30 may not need any more apertures for each of the photodiode 42 as explained above.

However, the backlight in accordance with the prior art still has a problem that the light transmitted through the fitting protrusions 16 as in the lower protrusion 18 may have effects on detection of colors by the photodiode 42 as the clip 10 is transparent. Another problem is that the transmitted light may escape, for example through heat exhaust holes on a back wall of a liquid crystal display device.

In view of the foregoing, the present invention has been made with an object to provide a backlight and a liquid crystal display device having a capability to detect colors accurately by means of a light shade disposed between a chassis and a drive substrate to enclose a light receiving means and through holes for transmitting light from a transparent part of a lamp clip to the drive substrate.

Another object of the present invention is to provide the backlight and the liquid crystal display device having projected fitting members on the lamp clip, fitting holes formed on each of the reflector, the mounted substrate and the chassis for insertion of the fitting members, and cover members arranged on the light shade to surround the fitting holes, thereby preventing light from escaping through the fitting holes of the lamp clip into a space outside the chassis.

Still another object of the present invention is to provide a backlight and a liquid crystal display device having projected fixing members provided on the light shade and fixing holes formed on the drive substrate for insertion of the fixing members, thereby enhancing efficiency of works for fitting the light shade and the drive substrate.

Yet another object of the present invention is to provide the backlight and the liquid crystal display device having a light transparent protrusion formed on the transparent part of the lamp clip for insertion into the through holes and the light receiving means placed in the vicinity of a distal end of the light transparent protrusion, thereby rendering detection of colors more accurate.

There is provided a backlight in accordance with the present invention, comprising: a lamp and a light emitting diode; a lamp clip to secure the lamp held thereon to a chassis; a transparent part included in the lamp clip to pass light from a lamp side to a chassis side; a first board superposed on the chassis and provided with the light emitting diode; a second board disposed in an opposite side of the lamp relative to the chassis, provided with a circuit to drive the light emitting diode, and electrically connected to the first board; a through hole formed on each of the chassis and the first board to transmit light from the transparent part to the second board; a light receiver mounted on the second board to receive light passed the through holes; and a light shade disposed between the chassis and the second board to surround the through holes and the light receiver.

There is provided the backlight in accordance with the present invention, further comprising: a fitting part projecting and provided on the lamp clip; and a fitting hole formed on each of the chassis and the first board to be inserted therein with the fitting part; wherein the light shade includes a cover part to surround the fitting hole.

There is provided the backlight in accordance with the present invention, wherein the light shade includes an engagement part which is projecting thereon; and an engagement hole are formed on the second board to be inserted therein with the engagement part.

There is provided the backlight in accordance with the present invention, wherein the transparent part includes a light transparent protrusion to be inserted into the through holes; and the light receiver locates in vicinity of an end of the light transparent protrusion.

There is provided a liquid crystal display device in accordance with the present invention, comprising: a liquid crystal panel; and any one of the backlights in accordance with the present invention as explained above are provided.

The present invention permits the light receiving means (light receiver) to receive light passed only through the transparent part and detect colors in an accurate manner as the light shade surrounding the light receiving means and the through holes for transmitting (passing) light from the transparent part of the lamp clip to the drive substrate (second board) is disposed between the chassis and the drive substrate, so that the light passed through other than the transparent part is blocked by the light shade.

The present invention enables to block light from escaping through, for example heat exhaust holes on a back wall of the liquid crystal display device, as the lamp clip has the projected fitting members (fitting parts), the fitting holes are formed on each of the reflector, the mounted substrate (first board) and the chassis for insertion of the fitting members, the light shade is provided with the cover members (cover parts) surrounding the fitting holes, and the cover members prevent light from escaping through the fitting holes into a space outside the chassis.

The present invention permits to fit the drive substrate to the chassis after securing the light shade onto the drive substrate and enhance efficiency of fitting works as the light shade has projected fixing members (engagement parts) and fixing holes (engagement holes) are formed on the drive substrate (second board) for insertion of the fixing members.

The present invention permits to direct light on the side of the lamps to the light receiving means through the light transparent protrusion of the lamp clip and detect colors accurately as the light transparent protrusion is formed on the transparent part of the lamp clip for insertion into the through holes and the light receiving means is located in the vicinity of a distal end of the light transparent protrusion.

The present invention permits accurate detection of colors by blocking light transmitted through other than the transparent part of the lamp clip.

According to the present invention, light is prevented from escaping through the fitting holes for the lamp clip into a space outside the chassis. More specifically, light is prevented from escaping through, for example heat exhausting holes on a back wall of the liquid crystal display device.

According to the present invention, efficiency of works for fitting the light shade and the drive substrate can be improved.

According to the present invention, light on a side of the lamps can be directed to the light receiving means and accuracy in detecting colors can be advanced.

The above and further objects and features of the invention will more fully be apparent from the following detailed description with accompanying drawings.

BRIEF DESCRIPTION OF THE SEVERAL VIEWS OF THE DRAWINGS

FIG. 6 is a perspective view showing an exemplary cover;

DETAILED DESCRIPTION OF THE INVENTION

Figure 3:
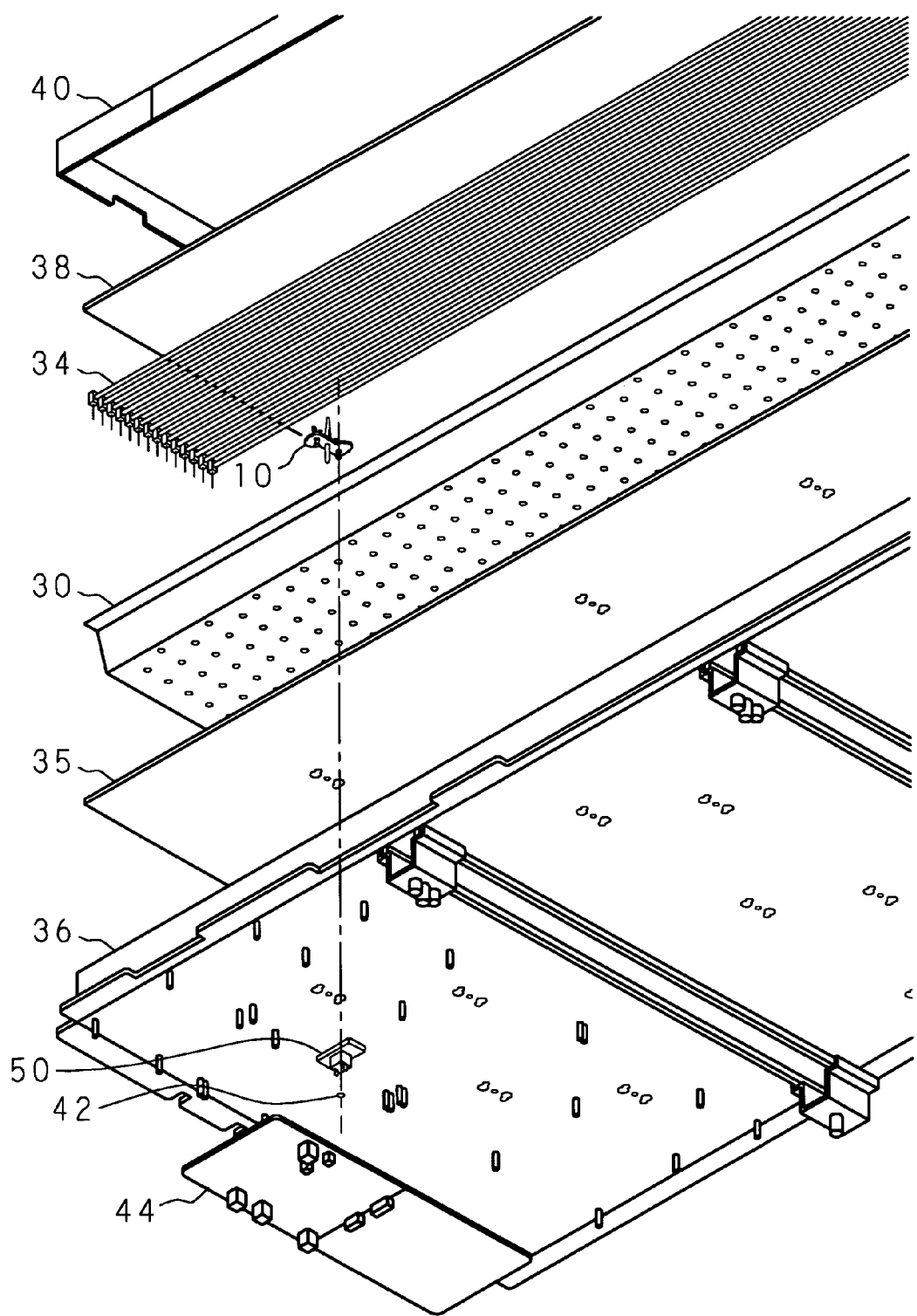
FIG. 3 is an exploded perspective view of a backlight and a liquid crystal display device in accordance with the present invention.
Figure 4:
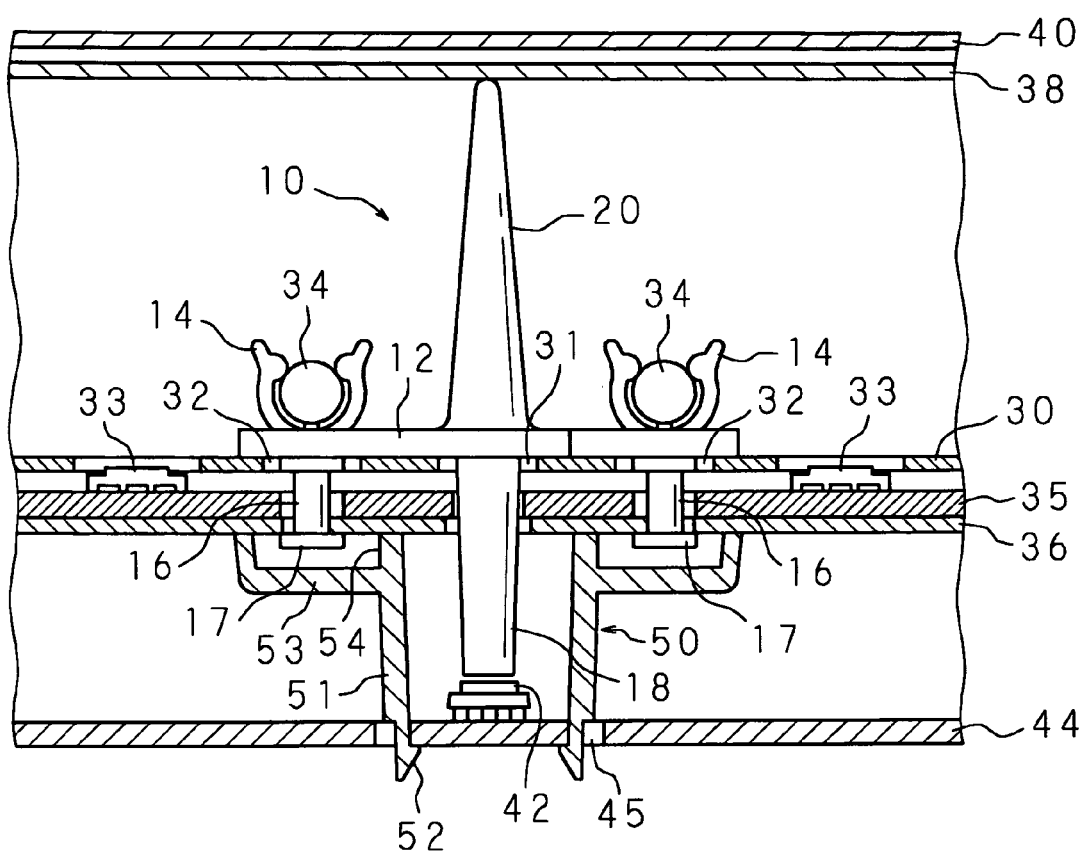
FIG. 4 is a sectional view of a lamp clip part of the backlight having features of the present invention.

The present invention will be explained specifically hereinafter based on the drawings showing embodiments in accordance with the present invention. FIG. 3 is an exploded perspective view of a backlight and a liquid crystal display device in accordance with the present invention and FIG. 4 is a sectional view of a lamp clip area of the backlight having features of the present invention. The lamp clip (or merely "clip") 10 comprises U-shaped supports 14 disposed on an upper surface close to the both short sides of an rectangular flat plate 12 for supporting lamps (fluorescent lamps) 34 by holding the lamps and also an upper protrusion 20 at a center of the upper surface of the flat plate 12 for supporting an optical sheet 38 located beneath a liquid crystal panel 40. The clip 10 also comprises cylindrical fitting protrusions (fitting parts) 16 having a circular plate portion at respective distal ends 17 and projected from a lower surface close to the both short sides of the flat plate 12 and a lower protrusion (light transparent protrusion) 18 disposed at a center of the lower surface of the flat plate 12. Furthermore, semicircular protrusions are formed on side surfaces extending lengthwise of the flat plate 12 at respective locations in a symmetrical manner in relation to the upper protrusion 20. Also, the whole of the clip 10 is transparent to permit light to transmit (pass) therethrough. Consequently, the whole of the flat plate 12 constitutes a light transparent part.

Figure 5A:
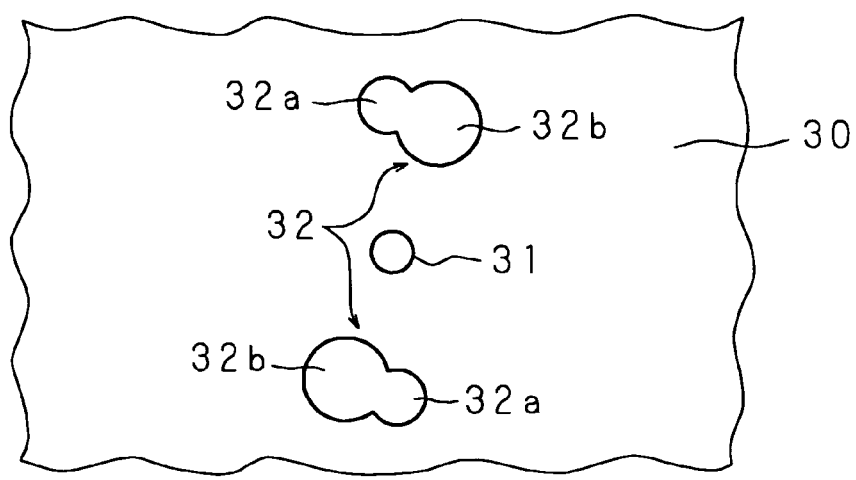
FIGS. 5A to 5C are enlarged views of a surface of a reflective sheet having features of the present invention.
Figure 5B:
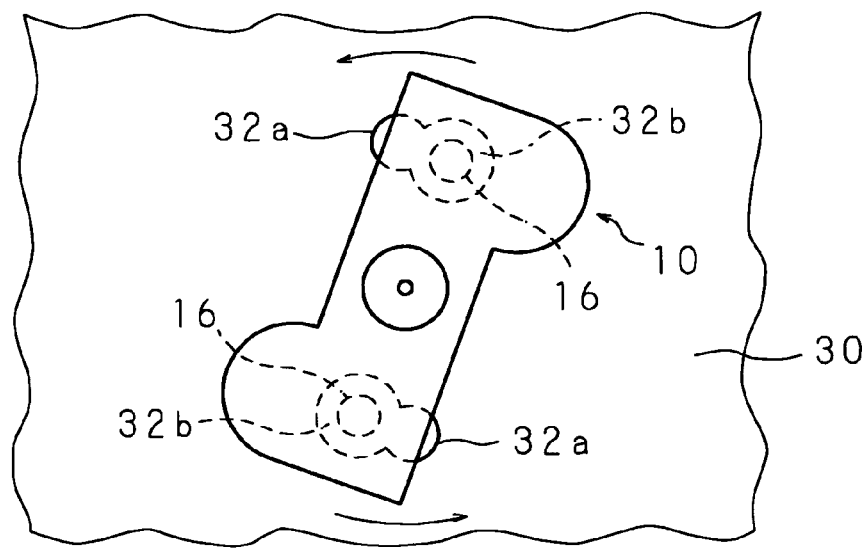
Figure 5C:
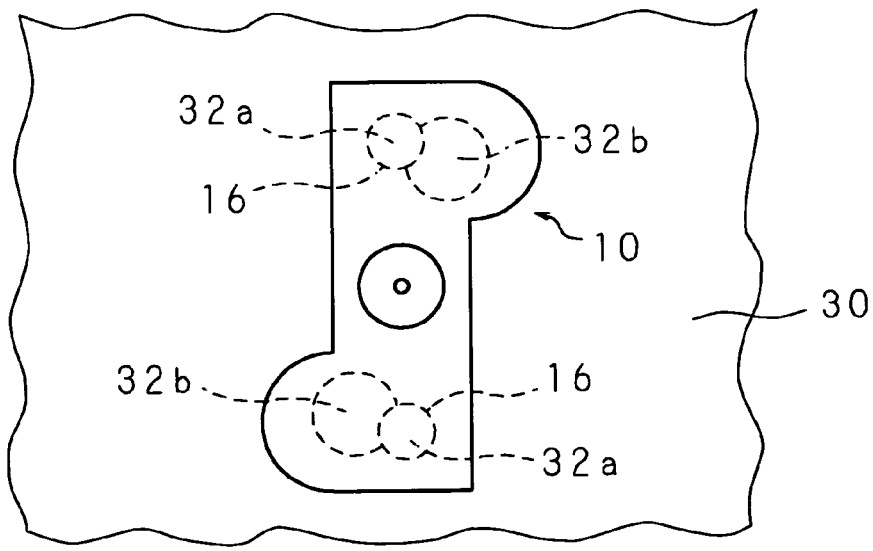

An LED substrate (mounted substrate, first board) 35 mounted with LEDs (light emitting diodes) 33 is disposed beneath a reflective sheet (reflector) 30 and a chassis 36 is located on a lower surface of the LED substrate 35. Fitting holes (fixing holes) 32 and an insert hole (through hole) 31 are formed on each of the reflective sheet 30, the LED substrate 35 and the chassis 36, and the fitting holes 32 and the insert holes 31 are overlapped each other at the same position. FIG. 5A is an enlarged view illustrating a surface of the reflective sheet 30 in order to show an example of the fitting holes 32 and the insert hole 31 having features of the present invention. Similarly, FIGS. 5B and 5C are enlarged views illustrating the surface of the reflective sheet 30 in order to show steps for mounting the clip 10 on the reflective sheet 30 having features of the present invention.

Each of the fitting holes 32 is, for example a potbelly-shaped through hole having a constricted part in the middle of the opening, in which one side of the opening area segregated by the constricted part is different from that of the other side. Each of the fitting holes 32 includes an insert section 32b through which one of the fitting protrusions 16 of the clip 10 is inserted and a fitting section 32a holding the fitting protrusions 16 moved to a direction along the reflective sheet 30 from the insert section 32b. Having a larger size than a diameter of the distal end 17 of the fitting protrusion 16 of the clip 10, the insert section 32b can accommodate the distal end 17, whereas since the opening of the fitting section 32a has substantially the same size with the fitting projection 16 of the clip 10 so that the fitting section 32a is capable to fittingly engage with the fitting protrusion 16.

Also, the insert section 32b and the fitting section 32a of the two fitting holes 32 are arranged in an opposite direction with respect to each other. In the example illustrated, both of the fitting holes 32 are formed along a vertical line, and the fitting section 32a of the upper fitting hole 32 is located at a left side of the insert section 32b and the fitting section 32a of the lower fitting hole 32 is located at a right side of the insert section 32b. In this case, a distance between centers of the respective fitting holes 32 is the same with a distance between centers of the respective fitting protrusions 16 of the clip 10. The insert holes 31 through which the lower protrusion 18 of the clip 10 is inserted are formed at a center between the respective fitting section 32a. Also, each of the fitting protrusions 16 of the clip 10 has a height slightly larger than a thickness reached when the reflective sheet 30, the LED substrate 35 and the chassis 36 are stacked. In FIGS. 5B and 5C, supports 14 of the clip 10 are omitted.

An opening is formed on the reflecting sheet 30 at a location opposing each of the LEDs 33 mounted on the LED substrate 35. The LEDs 33 are driven by a drive circuit on an LED drive substrate (drive substrate) 44 disposed on the outside of the chassis 36. The LED drive substrate 44 is provided with a light receiving means such as a photodiode 42 in the vicinity of a distal end of the lower protrusion 18 of the clip 10. The drive circuit on the LED drive substrate 44 controls the LEDs 33 based on light detection signals of the photodiode 42. The photodiode 42 has a capability to detect three colors of R (red), G (green) and B (blue) and the LEDs 33 have a capacity to emit three colors of R, G and B.

A cover (light shade) 50 covering a lower protrusion 18 of a clip 10 is disposed between the LED drive substrate 44 and the chassis 36. FIG. 6 is a perspective view showing an example of the cover 50. The cover 50 comprises a lower protrusion cover 51 having a rectangular tube-shape in its cross-section, fitting protrusion covers (cover members) 53 having a rectangular box-shape at opposing two sides adjacent the upper end of the lower protrusion cover 51 and fixing protrusions (fixing members) 52 provided on opposing sides of lower ends of the lower protrusion cover 51. The lower protrusion cover 51 encloses the insert hole 31 of the chassis 36 and the photodiode 42 on the LED drive substrate 44 and the fitting protrusion covers 53 shade the distal ends 17 of the fitting protrusions 16 of the clip 10 (or the fitting holes 32 of the chassis 36). Partitions 54 segregate the lower protrusion cover 51 and the fitting protrusion covers 53. The cover 50 is black to block light.

Fixing holes 45 are formed around the photodiode 42 of the LED drive substrate 44 for insertion and fixing the fixing protrusions 52 of the cover 50. With the fixing protrusions 52 being inserted through the fixing holes 45, the cover 50 is held between the chassis 36 and the LED drive substrate 44. The cover 50 has a height commensurate with the size of a space between the chassis 36 and the LED drive substrate 44. As a result, a lower opening of the cover 50 is closed by the LED drive substrate 44 and similarly an upper opening of the cover 50 by the chassis 36.

In mounting the clip 10, as shown in FIG. 5B, the lower protrusion 18 of the clip 10 is inserted through the insert hole 31 and the two fitting protrusions 16 of the clip 10 are inserted through the insert sections 32b of the two fitting holes 32, respectively. After the insertion, the clip 10 is rotated counterclockwise about the central axis of the lower protrusion 18 as shown in FIG. 5C to fittingly engage the fitting protrusions 16 with fitting sections 32a of the fitting holes 32, respectively. When the fitting protrusions 16 are fitted with (snugly held inside) the fitting sections 32a, the reflective sheet 30, the LED substrate 35 and the chassis 36 are held integrally between the flat plate 12 of the clip 10 and the distal ends 17 of the fitting protrusions 16, thereby the clip 10 is mounted on the reflective sheet 30. At this moment, the insert sections 32b are covered with the semicircular protrusions of the clip 10.

Figure 1:
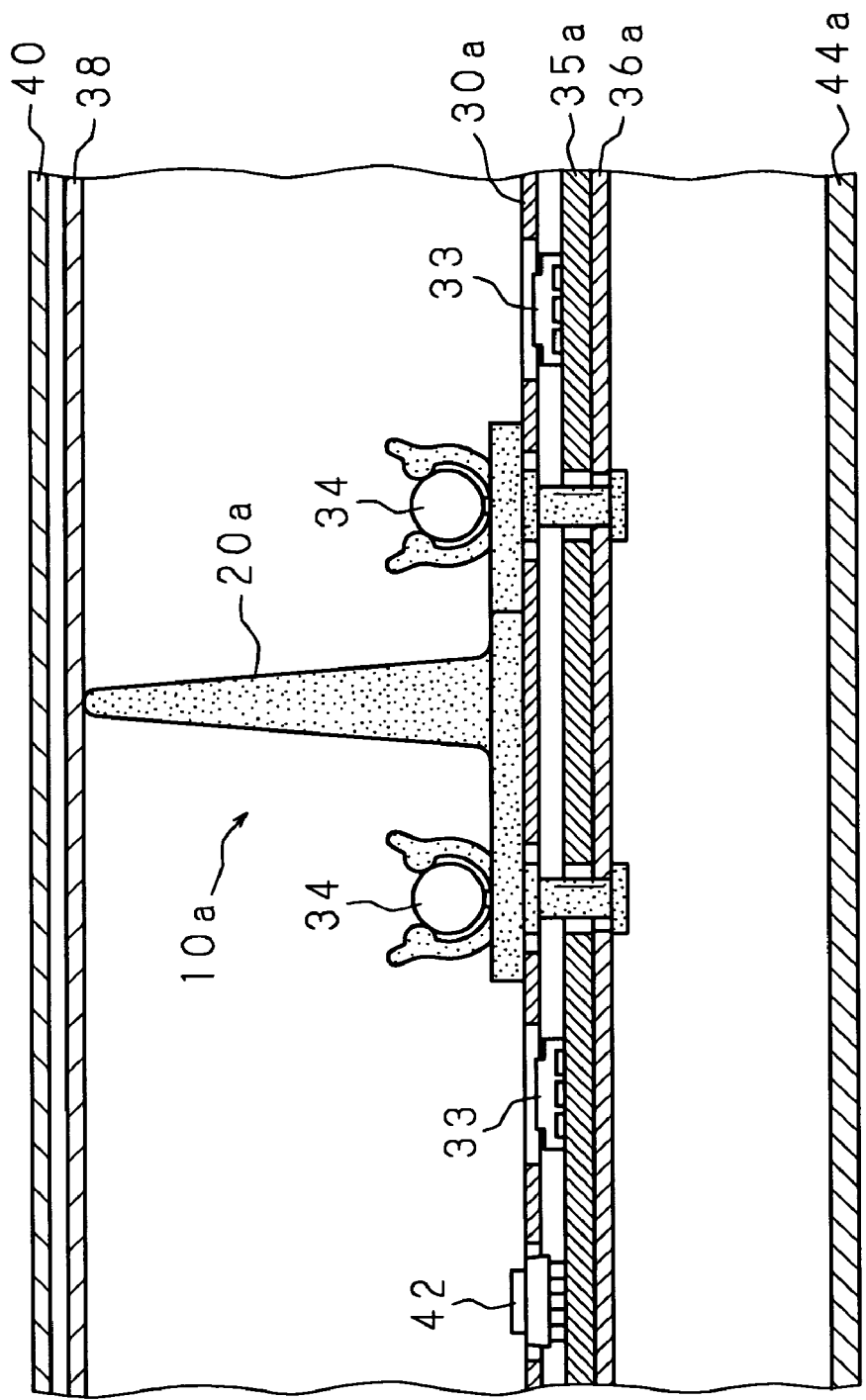
FIG. 1 is a sectional view showing in a simplified manner an exemplary construction and arrangement of a backlight in accordance with the prior art.
Figure 2:
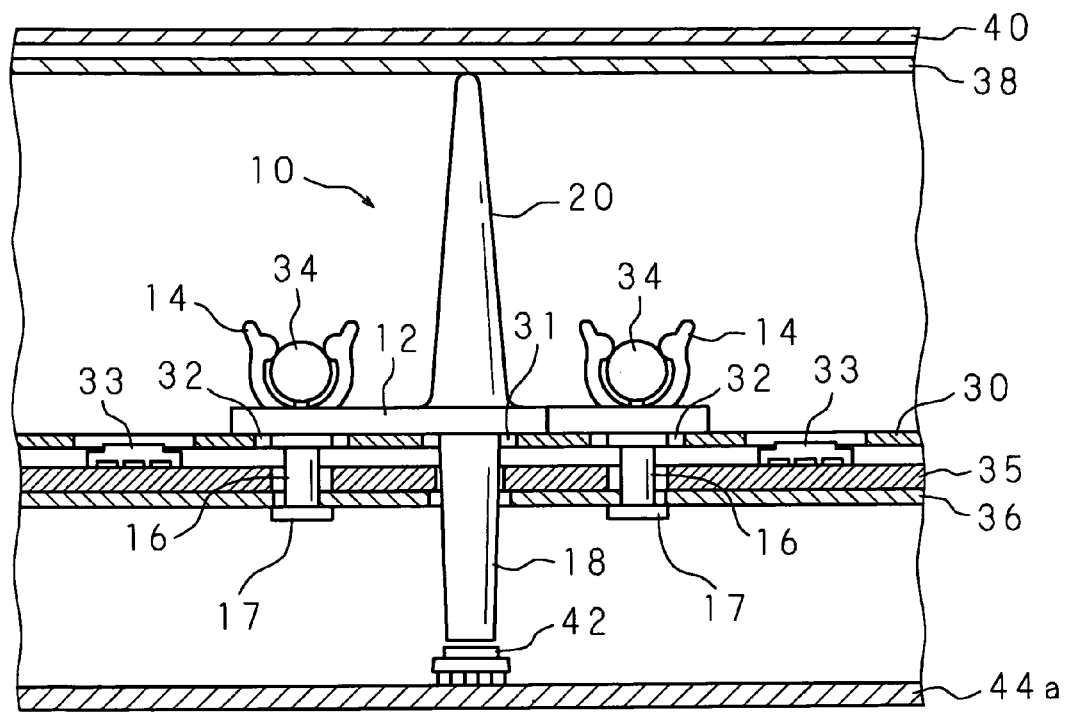
FIG. 2 is a sectional view showing in a simplified manner another exemplary construction and arrangement of a backlight in accordance with the prior art.

It is to be noted that a plurality of clips having the features as explained with respect to the clip 10 hereinabove are mounted at a plurality of locations of the reflective sheet 30. However, the conventional white clip (refer to FIG. 1) that reflects light may be used at a location where there is no need to detect colors by means of the photodiode 42. Also, rather than arraying all clips in a row on the reflective sheet 30, clips of one row are positioned so as to offset or stagger with respect to those of an adjacent row. As explained previously, the supports 14 of the clip 10 hold the lamp 34, the upper protrusion 20 of the clip 10 supports the optical sheet 38, and the liquid crystal panel 40 is positioned over the optical sheet 38. To secure the LED drive substrate 44 onto the chassis 36 the fixing protrusions 52 of the cover 50 are inserted through the fixing holes 45 of the LED drive substrate 44.

Light around the upper protrusion 20 is directed toward the photodiode 42 through the upper protrusion 20 and the lower protrusion 18 of the clip 10. The lower protrusion cover 51 and the partitions 54 of the cover 50 controls the transmission of light such that the photodiode 42 receives only the light radiated from the lower protrusion 18 of the clip 10. By this arrangement, color detection becomes free from effects of light that may have been directed through the fitting protrusions 16 and the like and its accuracy can be enhanced. Also, the fitting protrusion covers 53 prevent the light directed by the fitting protrusions 16 from escaping into a space outside the chassis 36. As a result, escape of light through heat exhaust holes on a back wall of the device (not shown) is effectively blocked.

Figure 7:
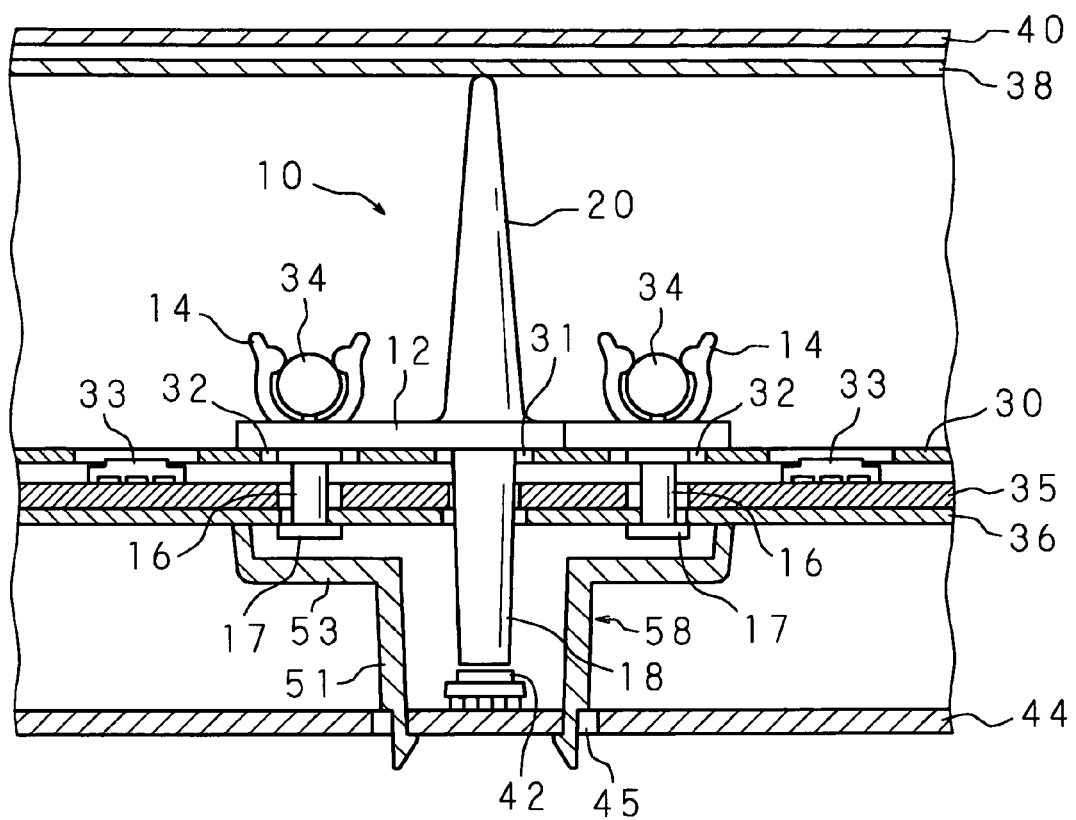
FIG. 7 is a sectional view of the clip area of the backlight showing an exemplary cover without partitions having features of the present invention.

FIG. 7 is a sectional view of a lamp clip area of the backlight illustrating an exemplary cover 58 without the partitions 54 having the features of the present invention. Without the partitions 54, the light directed through the fitting protrusions 16 is prevented from escaping into the space outside the chassis 36. However, the light may have effects over the strength of the light radiated from the lower protrusion 18. In view of the foregoing, it is preferable to provide the cover 50 with the partitions 54.

Figure 8:
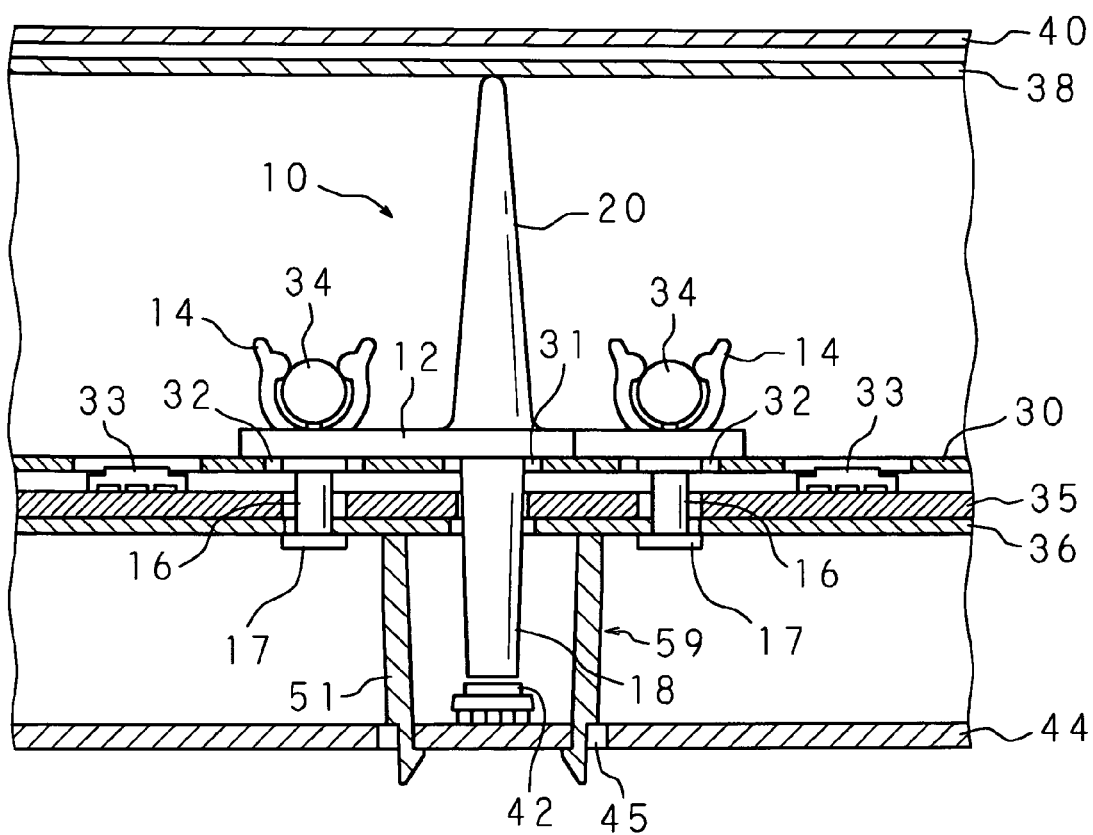
FIG. 8 is a sectional view of the clip area of the backlight showing an exemplary cover without fitting protrusion covers having features of the present invention.

FIG. 8 is a sectional view of a lamp clip area of the backlight illustrating an exemplary cover 59 without fitting protrusion covers 53 having the features of the present invention. Without the fitting projection covers 53, the photodiode 42 receives only the light directed through the lower protrusion 18 of the clip 10 but the light directed through the fitting protrusions 16 escapes into the space outside the chassis 36. In view of the foregoing, it is preferable to provide the cover 50 with the fitting protrusion covers 53.

As this invention may be embodied in several forms without departing from the spirit of essential characteristics thereof, the present embodiment is therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

What is claimed is:

1. A backlight, comprising:
a lamp and a light emitting diode;
a lamp clip to secure the lamp held thereon to a chassis;
a transparent part included in the lamp clip to pass light from a lamp side to a chassis side;
a first board superposed on the chassis and provided with the light emitting diode;
a second board disposed in an opposite side of the lamp relative to the chassis, provided with a circuit to drive the light emitting diode, and electrically connected to the first board;
a through hole formed on each of the chassis and the first board to transmit light from the transparent part to the second board;
a light receiver mounted on the second board to receive light passed through the through holes; and
a light shade disposed between the chassis and the second board and surrounding the through holes and the light receiver.

2. The backlight according to claim 1, further comprising:
a fitting part projecting and provided on the lamp clip; and
a fitting hole formed on each of the chassis and the first board to be inserted therein with the fitting part; wherein
the light shade includes a cover part to surround the fitting hole.

3. The backlight according to claim 2, wherein
the light shade includes a engagement part which is projecting; and
an engagement hole are formed on the second board to be inserted therein with the engagement part.

4. The backlight according to claim 2, wherein
the transparent part includes a light transparent protrusion to be inserted into the through holes; and
the light receiver locates in the vicinity of an end of the light transparent protrusion.

5. The backlight according to claim 1, wherein the light shade includes an engagement part which is projecting thereon; and
an engagement hole are formed on the second board to be inserted therein with the engagement part.

6. The backlight according to claim 5, wherein
the transparent part includes a light transparent protrusion to be inserted into the through holes; and
the light receiver locates in the vicinity of an end of the light transparent protrusion.

7. The backlight according to claim 1, wherein
the transparent part includes a light transparent protrusion to be inserted into the through holes; and
the light receiver locates in vicinity of an end of the light transparent protrusion.

8. The backlight according to claim 1, further comprising a reflective sheet superposed on the first board to reflect light emitted by the lamp to an opposite direction with respect to the first board, wherein
a through hole is formed on the reflective sheet, corresponding to the through hole on each of the chassis and the first board.

9. The backlight according to claim 1, wherein
the light receiver outputs a signal to the circuit of the second board to control driving of the light emitting diode in response to the light received; and
the light emitting diode is driven based on the signal inputted into the circuit of the second board.

10. The backlight according to claim 1, further comprising:
a fitting part projecting and provided on the lamp clip.

11. The backlight according to claim 10, further comprising:
a fitting hole formed on each of the chassis and the first board to be inserted therein with the fitting part.

12. The backlight according to claim 1, wherein the light shade includes an engagement part which is projecting thereon.

13. The backlight according to claim 1, wherein the light shade is fixed between the chassis and the second board.

14. A backlight, comprising:
a lamp and a light emitting diode;
a lamp clip to secure the lamp held thereon to a chassis;
a transparent part included in the lamp clip to transmit light from a lamp side to a chassis side;
a first board superposed on the chassis and provided with the light emitting diode;
a second board disposed in an opposite side of the lamp relative to the chassis, provided with a circuit to drive the light emitting diode, and electrically connected to the first board;
a through hole formed on each of the chassis and the first board to transmit light from the transparent part to the second board;
a light receiver mounted on the second board to receive light passed through the through holes;
a light shade disposed between the chassis and the second board surrounding the light receiver;
a fitting part projecting and provided on the lamp clip; and
a fitting hole formed on each of the chassis and the first board to be inserted therein with the fitting part; wherein
the light shade includes a cover part surrounding the through holes and the fitting holes.

15. A backlight, comprising:
a lamp and a light emitting diode;
a lamp clip to secure the lamp held thereon to a chassis;
a transparent part included in the lamp clip to pass light from a lamp side to a chassis side;
a first board superposed on the chassis and provided with the light emitting diode;
a second board disposed in an opposite side of the lamp relative to the chassis, provided with a circuit to drive the light emitting diode, and electrically connected to the first board;
a through hole formed on each of the chassis and the first board to transmit light from the transparent part to the second board;
a light receiver mounted on the second board to receive light passed the through holes; and a light shade disposed between the chassis and the second board surrounding the through holes and the light receiver, wherein a liquid crystal display device comprises a liquid crystal panel; and
the backlight.

* * * * *